April 8, 1952
A. J. PEDIGO
2,591,862
REFRIGERATOR
Filed Dec. 5, 1947
4 Sheets-Sheet 1
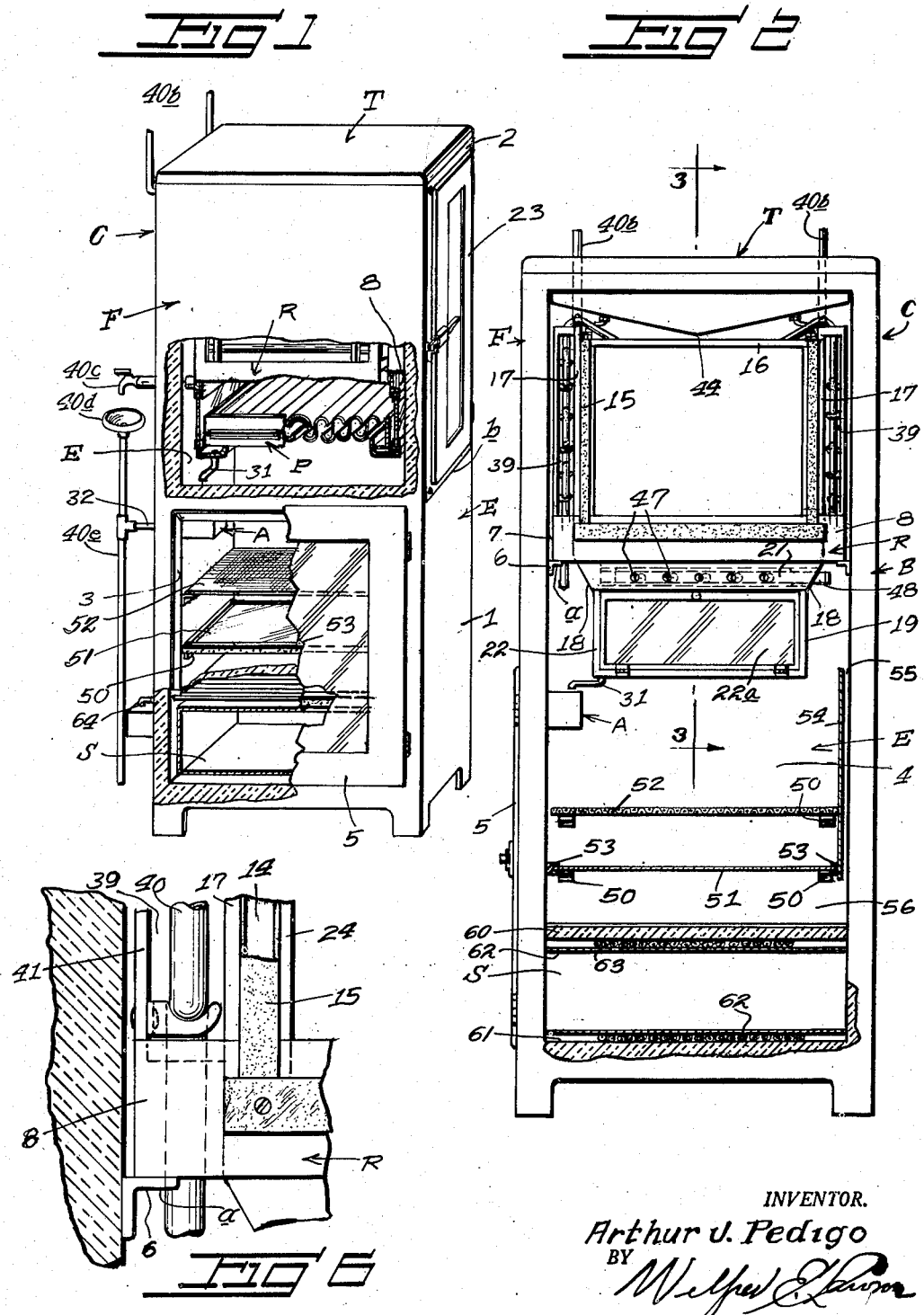
INVENTOR.
Arthur J. Pedigo
BY
Attorney April 8, 1952     A. J. PEDIGO     2,591,862
REFRIGERATOR
Filed Dec. 5, 1947     4 Sheets-Sheet 2
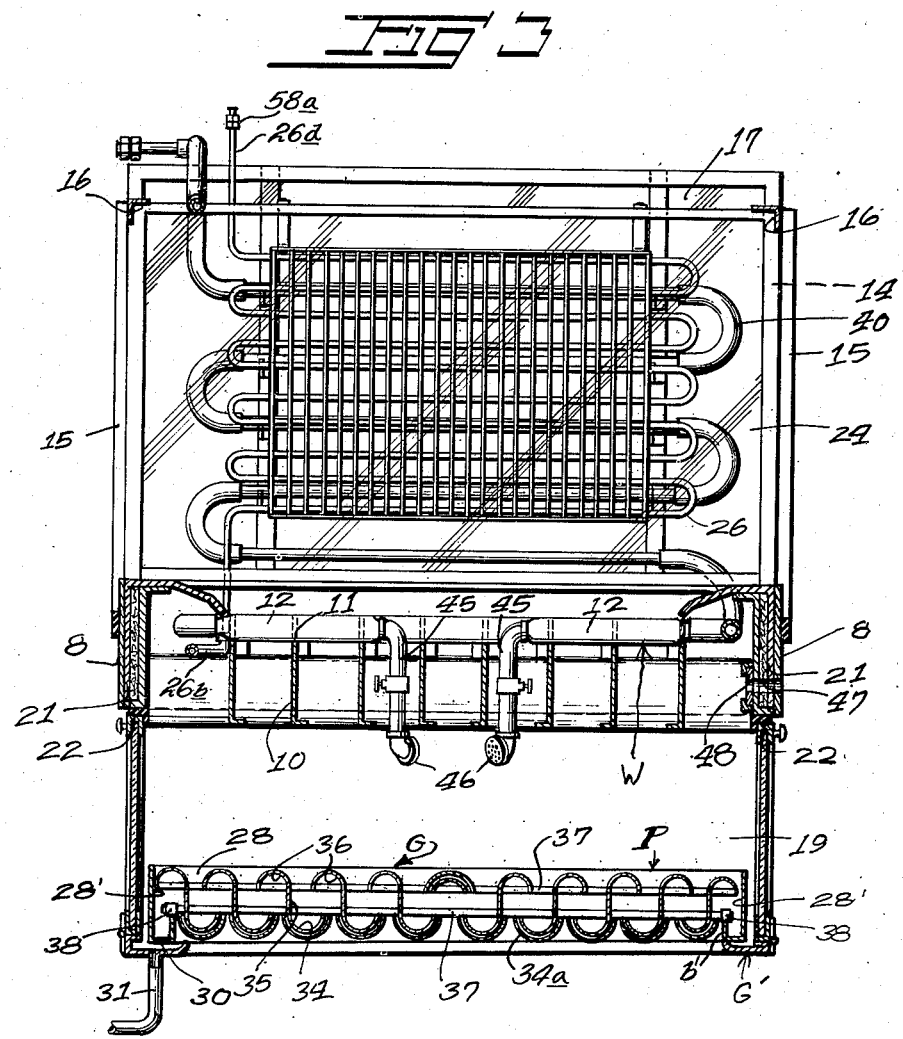
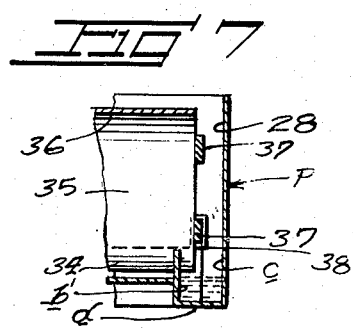
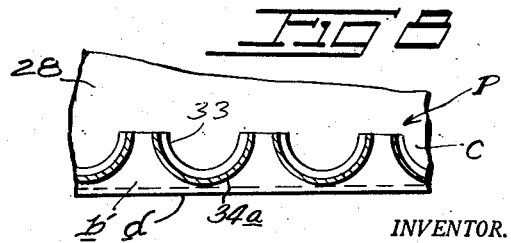
INVENTOR.
Arthur J. Pedigo
BY
Attorney April 8, 1952  A. J. PEDIGO  2,591,862
REFRIGERATOR
Filed Dec. 5, 1947  4 Sheets-Sheet 3
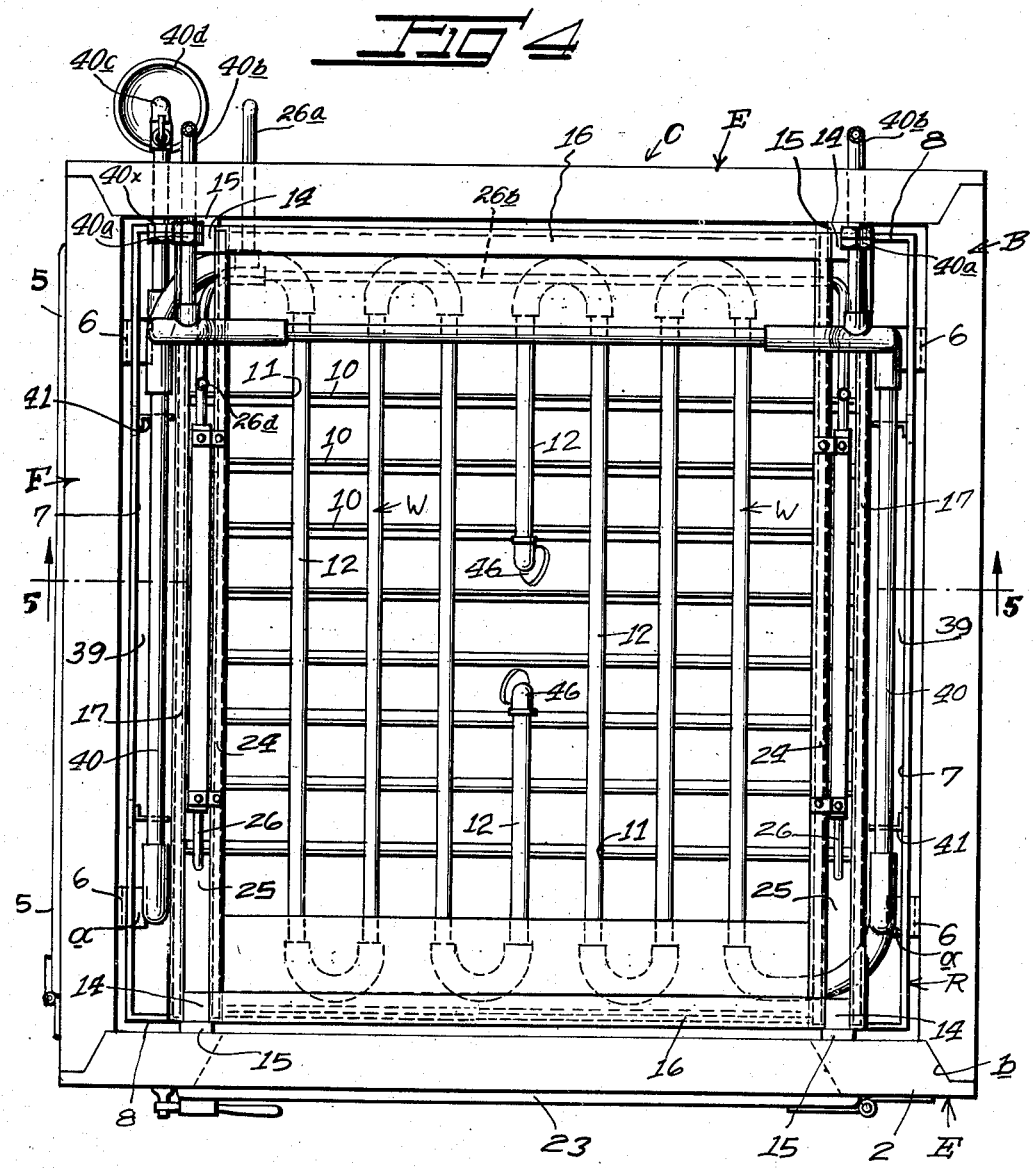
INVENTOR.
Arthur J. Pedigo
BY
Wilfred E. Lawson
ATTORNEY

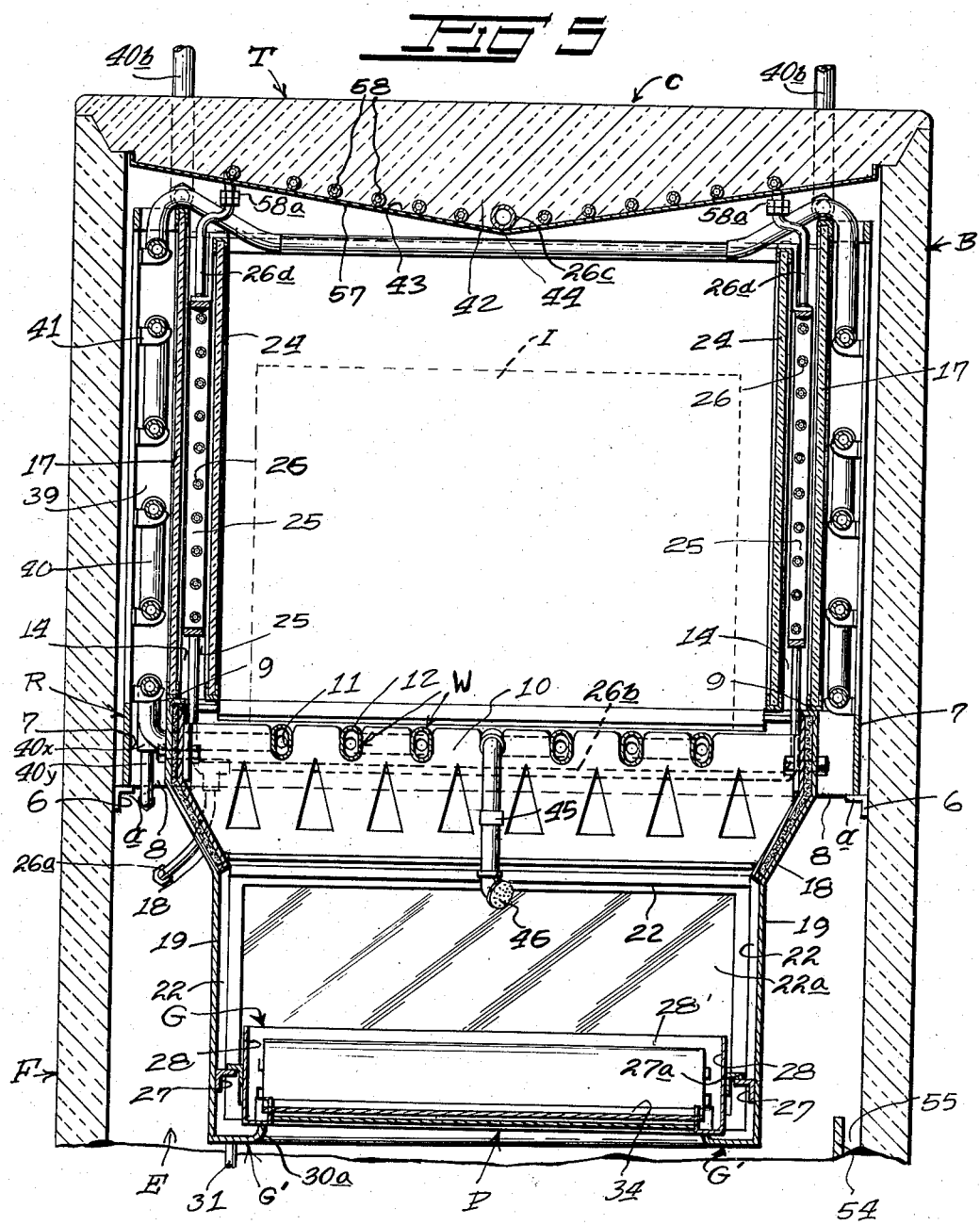

Patented Apr. 8, 1952

2,591,862

UNITED STATES PATENT OFFICE 2,591,862

REFRIGERATOR

Arthur J. Pedigo, Richmond, Va.

Application December 5, 1947, Serial No. 789,907

12 Claims. (Cl. 62—89)

1

This invention relates to refrigerating apparatus and constitutes more particularly an improvement of the apparatus as embodied in my prior Patents Nos. 2,238,074; 2,238,284; 2,346,184; and 2,410,232.

It is an object of the invention to provide an apparatus of this kind embodying both ice and mechanical refrigeration for maintaining desired temperature within the food chamber and wherein the assembly is such as to permit ready application or removal of the refrigerating assembly.

The invention also has for an object to provide an apparatus of this kind including a refrigerating chamber and a food chamber in superimposed relation together with means to effect a circulation of air through both of the chambers and wherein means are provided for cooling the air stream as it enters the refrigerating chamber.

A still further object of the invention is to provide an apparatus of this kind including a refrigerating chamber open at its top for admission of a circulating air stream and wherein a roof is disposed over but spaced from the open top of the chamber, said roof providing means for deflecting the air stream downwardly within the refrigerating chamber.

An additional object of the invention is to provide an apparatus of this kind having a refrigerating chamber open at its top for admission of air in circulation together with a roof disposed over but spaced from said open top, said roof being provided with means to prevent accumulation of frost thereon and thus eliminate the necessity of defrosting.

A still further object of the invention is to provide a refrigerating apparatus including a refrigerating chamber together with air flues only at the front and back of the chamber, said flues leading from a food chamber and delivering through the top within the refrigerating chamber, said arrangement of the flues assuring complete circulation of the air within the food chamber with the elimination of any dead air pockets which would be detrimental to the preservation of the food within the food chamber.

Furthermore it is an object of the invention to provide an apparatus of this kind including a refrigerating chamber positioned above the food chamber, said chambers being separated by a drip pan, said pan being constructed in the form of a grid to allow passage of air therethrough but separating therefrom the water resulting from the melting ice, said grid pan also providing a medium for washing and transferring heat from

2 such air eddies that may flow upwardly from the food chamber.

The invention consists in the details of construction and in the combination and arrangement of the several parts of my improved refrigerator, whereby certain advantages are attained, as will be hereinafter more fully set forth.

In order that my invention may be better understood, I will now proceed to describe the same with reference to the accompanying drawings, wherein:

Figure 1 is a view in perspective of a refrigeraating apparatus constructed in accordance with an embodiment of the invention;

Figure 2 is a view in side elevation with the end wall removed;

Figure 3 is a vertical sectional view taken through the ice chamber unit unapplied, the section being substantially on the line 3—3 of Figure 2;

Figure 4 is a view in top plan with top wall removed;

Figure 5 is a sectional view taken substantially on the line 5—5 of Figure 4;

Figure 6 is a view partly in section and partly in elevation showing certain details of assembly;

Figure 7 is a fragmentary sectional view taken through the drip pan; and

Figure 8 is a fragmentary sectional view taken through the drip pan on a line substantially at right angles to Figure 7 with parts omitted.

In the embodiment of the invention as illustrated in the accompanying drawings C denotes a case or box of desired dimensions but preferably having the front and rear walls of a length greater than that of the end walls. Each of the end walls E of the case comprises a permanent bottom panel 1 and a removable top panel 2, said bottom panel being removably disposed over an opening b, Figure 1, of a size to permit convenient access to any point within the upper portion of the case or box C or to allow the ready application or removal of the refrigerating assembly or unit.

The front wall F in its lower portion is provided in its lower part with a door opening 3 to afford access to the food chamber 4 within the lower portion of the case or box C and which opening is closed by a conventional door 5. Within the food chamber 4 are suitably arranged the shelves hereinafter described, certain of which being of a perforated type to allow free circulation of air therethrough.

The front wall F and the back wall B at the required distances below the top T of the case or box B, have secured thereto the angle brackets 6. The brackets 6 have the inwardly directed horizontal flanges a, which provide supports for the refrigerating assembly or unit.

Resting upon the brackets 6 are front and back members 7 of a frame R, which includes the connecting side or end members 8. Spaced inwardly from the member 7, are the flat strips 9 having their faces substantially vertically disposed and interposed between these strips 9 and welded or otherwise rigidly secured thereto are the equidistantly spaced flat strips or members 10, shown in Figures 3 and 4. The upper marginal portions of the strips or members 10 are provided with the spaced recesses 11, in which are received the straight portions 12 of the water coils W.

Rigidly secured to the corner portions of the frame R are the lower extremities of the upstanding posts 14, the outer side faces of which having disposed thereover strips 15 of yielding material, such as rubber, with which the side or end wall panels 2 contact to assure air tight seals. The top portions of these posts 14 are connected by the rigid members 16, to assure maintenance of the posts 14 in proper positions.

Secured to the those faces of the posts 14, which are opposed to the front wall F and the back wall B, are the vertical walls 17, of heat insulating material and which extend from one end E of the case or box C to the other end and from the frame R to a relatively close proximity to the top T. These walls 17 are continued inwardly and downwardly by the inclined aprons 18, which in turn are joined to the depending and substantially parallel walls 19. See Figure 5.

Depending from each of the end members 8 of the frame R is an end wall 21 formed in its lower part to provide an opening frame 22 through which access is had to the air conditioning chamber when the adjacent panel 2 is removed or the door 23 of said panel open. This frame is closed by the door 22a.

Suitably secured to the faces of the posts 14 remote from, or inwardly of, the applied walls 17, are the walls 24 of metal or such other material readily conductive of heat. These coacting walls 17 and 24 provide therebetween vertical flues 25 in which are arranged the refrigerating coils 26 operating in the conventional manner as defined in my previously issued patents.

The mechanical mechanism for supplying the coils 26 with the refrigerant are not here illustrated. Such mechanism may be of any standard character and maintained at a suitable location outside the refrigerator structure, the compressed refrigerant gases being supplied to the coils through the coupling or lead-in line 26a, the coils being connected together by the cross over pipe 26b indicated in dotted lines in Figures 4 and 5. Return of the gases from the coils may be effected in any suitable manner as, for example, by way of a pipe 26c located in the top T of the structure and to which the refrigerant gases are carried through coils in the top structure from the side coils 26, in the manner hereinafter described.

The depending walls 21 are of lengths less than the width of the opening 3 in the adjacent panel 2, so that the drip pan structure P, can be readily passed through the opening when the door 23 is opened without requiring removal of the panel 2. The lower extremities of the walls 19 carry the bracket flanges 27 which provide supports for the structure P, as shown in Figure 5.

As herein embodied, the drip pan structure P comprises a gutter frame G rectangular in plan and which has front and back members 28 carrying runners 27a freely resting on the flanges 27 and slidable therealong to permit introduction and/or removal of the pan structure. The members 28 and the connecting end members 28' of the frame G, are U-shaped in cross section from end to end with the adjacent members in communication. The inner side flanges b' of the members 28 and 28' are of a height materially less than that of the outer flanges c and the bottom wall d of the members 28 and 28' gradually incline from one corner of the frame G to a discharge opening 30 at the diagonally opposite corner of the frame so that the water discharge in the gutter-like frame members 28 and 28' will flow to this discharge opening 30. The water passing through opening 30 is received in the inwardly extending gutter flange G', which, as shown in Figures 3 and 5, lies beneath the flanges b', c and the connecting bottom d, from which it flows into the drain pipe line 31 delivering into a receptacle A carried by an adjacent wall of the case or box C, as shown in Figures 1 and 2. The receptacle A may be of any desired character although it is preferred that it extend to the exterior of the case or box C for connection with a carry-off pipe 32.

The upper marginal portions of the inner flanges b' are provided therealong with the spaced recesses 33 herein shown as substantially semi-circular although of course I do not wish to be limited as to any particular design of recess.

Freely resting within the recesses 33 are the end portions of the trough members 34 open at their ends and discharging into the adjacent trough members of the frame. The members 34 are formed from or integral with, and disposed to one side of, the upstanding plates 35. These plates 35, on their upper margins, are provided with the inverted far downwardly curving longitudinal trough like members 36, the member 36 of one plate 35 being at the side remote from the trough member 34.

The plates 35 are maintained in desired assembled and spaced relation to the bars 37 welded or otherwise fixed secure to the end edges of the plates 35. In the present embodiment of the invention there are two bars 37 at the front and two at the back ends of the structure P. These bars are substantially parallel and arranged at the top and lower portions of the plates 35 with the lower bars 37 extending sufficiently beyond the end plates 35 to rest from above upon the inner flanges b' of opposed members of the frame G, such as member 28', as shown in Figure 3. The extremities of the lower bars 37 carry thimbles or sleeves 38 of rubber or other suitable material which have direct contact with the flanges b' to avoid contact of metal with metal.

Adjacent plates 35 are so spaced apart that the lower trough member 34 of one plate will be partially under the upper member 36 of the adjacent plate 35 whereby a free circulation of air will be permitted through the structure P, yet effectively separating water dripping down from the melting ice.

Extending from front to rear between the members 28 of the gutter frame G, are the transversely curved or substantially semi-circular channel members 34a, each of which substantially conforms in curvature to a recess 33 with which it is concentrically arranged. Each of these channel members 34a lies beneath and is spaced from a trough member 34 as shown in Figure 3.

The walls 17 and the end walls E of the case or box C coact to provide a refrigerating chamber of which the strips 9 and the portions 12 of the coils W form a grid bottom to support block ice I or the like placed within the chamber. In course of time, after a block of ice has been placed in the refrigerating chamber, the lower portion of the ice block will melt down in a manner to permit the ice block to extend down through the grid bottom resulting in the formation of lower ice columns whereby is provided increased ice surface to be contacted by the air circulating within the case or box C.

The ice can be conveniently placed within the refrigerating chamber upon opening the door 23 of end wall E of the casing or box C.

Each of the walls 17 is spaced from the adjacent front wall F or back wall B to provide a flue 39 open at the top and bottom and through which air flows upwardly from the food chamber and into the refrigerating chamber through the open top thereof. Arranged within each of the flues 39 is a water coil 40 having suitable detachable coupling, as at 40a, with a water supply pipe 40b. Each coil 40 delivers to one of the coils W, whereby water is precooled before entering such coil W. The coil 40 is held to the wall 17 in a desired manner as by a rack frame 41 carried by the frame R, so that the coil after being uncoupled from its source of supply will be removed with the refrigerating assembly or unit.

The top T of the case or shell C is insulated and has a portion 42 extending down within the case or box with the under face thereof disposed from the front and the rear toward the transverse center on an incline, as shown at 43 in Figure 5, with the lower point 44 below the upper marginal edges of the walls 17. This arrangement assures the air streams passing up through the flues 39 being deflected downwardly into the refrigerating chamber.

It is to be noted that the coils W are reversely disposed with their inner ends at substantially the center of the pan structure P when applied. The inner or free extremity of each of the coils is continued by a downwardly directed extension 45 to the lower end portion of which is coupled a mist or fog nozzle 46 which may be of any type preferred. The mounting of the nozzle 46 is such, however, as to permit the discharge therefrom to be directed as desired toward the front or back, either side, or as may otherwise be preferred. The nozzzle is disposed outwardly on a predetermined angle with respect to its associated extension 45 and by threading the nozzle upon the extension, the desired adjustment of the nozzle may be readily effected. However, I do not wish to be understood as limiting myself to any particular mounting of the nozzle other than to assure the desired adjustment for varying the direction of throw of the fog or mist from the nozzle.

The lower portions of the end members 8 of the frame are spaced from the applied panel 2 and to avoid pocketing of dead air within the resultant spaces, said lower portions of the members 8 are provided with the vents or openings 47 under control of the sliding valve member 48. With this vent 47 open, air will circulate up between the lower portions of the members 8 and the applied panels 2 and into the air conditioning chamber.

Supported within the food chamber by the brackets 50 or otherwise as may be preferred, are the vertically spaced shelves 51 and 52. While only a single shelf 52 is herein shown in the drawing, it is to be stated that they may be any other number desired, and the shelf 52 is either reticulated or foraminated to permit air circulation therethrough.

The lowermost shelf 51 is imperforate and is preferably of glass although any material may be employed that is conductive of heat.

The shelf 51 is of such dimensions as to substantially snugly fit within the food chamber and fitted on the marginal portions of the shelf 51 are the sealing strips 53 of suitable yielding material such as a rubber compound. The front sealing strip 53 has close contact with the inner faces of the side or end panels E. The rear sealing strip 53 has close contact with the lower marginal portion of an imperforate wall 54 extending entirely across the upper portion of the food chamber. This wall 54 is also in close proximity to the back wall B but spaced slightly therefrom to provide a flue 55. The lower end of this flue 55 is in communication with the space 56 of the food chamber 4 below the applied shelf 51 and the wall 54 is of a height to have the upper end of the flue 55 communicate with the upper portion of the food chamber 4 above the lower margins of the wall 21, as shown in Figure 2.

When the door 5 is in closed position, the front strip 53 has close contact with the inner face of such closed door 5. With the door 5 closed, it will be apparent that the strips 53 seal the marginal portions of the shelf 51 with respect to the adjacent walls and door of the case C to prevent passage of air up or down past the marginal portions of the shelf 51 so that the space 56 is tightly sealed except for the flue 55. Any odors which may emanate from any of the food stuffs within the space 56 will be readily carried up and out through the flue 55 and thus reduce to a minimum contamination of food within the space 56.

It is also to be explained that as the door 5 is opened from time to time, fresh air will be received within the space 56 and thus further the desired conservation of food within the space 56.

Under circumstances where it would be preferred to have humidity enter the space 56, the front strip 53 can be removed, and of course, other of such strips if it should be found necessary.

The inner face of the top T constitutes a lamination 57 of metal or other suitable material conductive of heat and in direct contact from above with this lamination 57 are heat absorption coils 58 whereby the air returning to the ice chamber through the open top thereof will be cooled sufficiently to minimized frosting. It is to be noted in Figure 5 of the drawings, that the coils 58 are entirely within the area defined by the open top of the ice chamber so that the air leaving the flues and passing over into the open top of the ice chamber will be subjected to the action of the coils 58.

The coils 58 are in two groups, separated by the return pipe 26c as shown in Figure 5. The outer end of each of these coils 58 is joined by a coupling 58a with the upwardly extending terminal portion 26d of the adjacent coil 26 as is most clearly shown in Figure 5.

If preferred, a shelf either foraminated or reticulated may be substituted for the shelf 51 when it is desired to admit humidity within the space 56.

It is believed to be obvious that in a refrigerating apparatus embodying the present invention, that by reason of the flues and vents, there will be a constant circulation of air throughout the entire case C and that desired humidity is maintained by the spray nozzles 46.

By having the ice chamber open at the top, most of the air in circulation within the case C, will enter the ice chamber from above and pass down and around the ice and return to the food chamber through the grid which constitutes the bottom of the ice chamber. The travel of the air down through the ice chamber is facilitated coming in the chilling of the air by contact with the lamination 57 of the top T and, of course, by the chilling resulting from the coils 40.

By having the grid bottom for the ice chamber upon which the ice is directly placed, the low temperature of the water within the coils W of the grid is maintained particularly during the periods when the mechanical cooling means is inoperative.

While the apparatus as illustrated in the accompanying drawings is designed particularly for household use, it is believed readily apparent that it could be made of suitable dimensions to enable the same to be employed in commercial establishments without departing from the principles of the invention as herein embodied.

The lower end of one of the water coils 40 is adapted to have connected therewith by means of a coupling 40x, a pipe 40y leading through the adjacent side wall of the case, to the outer end of which is connected a faucet 40c. By this means, when the coils are connected with a city water supply line or other source of potable water, cooled drinking water may be provided. Beneath the faucet 40c is positioned a catch basin 40d which is connected with the carry-off pipe 40e which leads to a disposal point and to which pipe the drainage pipe 32 is connected as shown in Figure 1.

In the lower part of the case, the food chamber is divided by a horizontal partition wall 60 which is in spaced relation with the bottom wall 61 of the lower part of the food compartment. Adjacent to the opposing faces of the walls 60 and 61 are thin partition plates 62 and between these plates and the adjacent walls 60 and 61 refrigeration pipes or coils 63 are housed. Thus the space between the plates 62, generally designated S, provides a quick freeze or a deep freeze chamber which is accessible through the door opening 3. Suitable connection may be made with the coils 63, outside the case, at the coupling box 64 with the refrigeration machinery, not shown.

I claim:

1. A refrigerating apparatus comprising, in combination, a case having a top wall, a horizontally disposed grid supported within the upper portion of the case, said grid constituting a bottom for an ice chamber and side wall forming the top of the ice chamber, side walls for the ice chamber spaced from the adjacent walls of the case to provide flues, said side walls terminating below the top wall of the case to provide an ice chamber with an open top, the under face of the top wall of the case having two downwardly inclined portions extending from opposite sides toward and joining at the center of said chamber, the joining line of said portions being below the top edges of the side walls of the ice chamber.

2. A refrigerating apparatus as set forth in claim 1, wherein cooling coils are arranged across the underface of said top wall.

3. A refrigerating apparatus comprising, in combination, a case including a side wall having an opening in its upper portion, a panel for closing said opening, said panel having a door opening, a door closing said door opening, an ice chamber forming receptacle positioned within the upper portion of the case and removable through the first opening, the top and bottom of the receptacle being open, means within the case with which the receptacle slidably engages for supporting the receptacle within the case, a grid forming a bottom for the receptacle, and a drip pan removably supported by the receptacles below the grid, and adapted to be introduced into and removed from the case through the door opening of the panel.

4. A refrigerating apparatus as set forth in claim 3, wherein the drip pan comprises a frame, the members of which constitute troughs, additional trough members supported between the frame members within the frame, said additional trough members having means for discharging liquid into certain of the trough members of the frame, the second trough members each having a portion spaced from and partially overlying an adjacent trough member whereby circulation of air is permitted between said second trough member without interfering with the collection of drippings within said second trough members.

5. A refrigerating apparatus, comprising in combination, a case, an ice chamber forming receptacle therein open at its bottom, a grid disposed across the bottom of the receptacle upon which ice within the receptacle is supported, said grid being tubular and comprising two sections each having a terminal adjacent to the center of the grid, means for coupling the grid sections to a water supply line, and a spray nozzle depending from and in communication with the said terminal of each section of the grid.

6. A refrigerating apparatus comprising a case, means within the upper portion of the case forming an ice chamber having an open top, a grid constituting the bottom of the ice chamber, said chamber forming means including spaced side walls providing flues in communication with the open top of the ice chamber and the upper portion of the case and with the food chamber within the case below the ice chamber, a wall within the lower portion of the case and spaced from a wall of the case to provide a flue open at its top and bottom, and an imperforate shelf within the food chamber and fitting snugly therein to form a horizontal partition positioned above the lower open end of the last named flue.

7. A refrigerating apparatus as set forth in claim 6, wherein the shelf is of a material conductive of heat.

8. A refrigerating apparatus as set forth in claim 6, wherein sealing strips are engaged with the marginal portions of the shelf for coacting with the adjacent walls of the case, certain of said strips being removable.

9. A refrigerating apparatus as set forth in claim 1, wherein the said side walls extend down below the grid, a drip pan, means for supporting the drip pan by and between said side walls at an elevation spaced below the grid, certain of said side walls being provided above the applied drip pan with vent openings.

10. A refrigerating apparatus as set forth in claim 1, wherein the said side walls extend down below the grid, a drip pan, means for supporting the drip pan by and between said side walls at an elevation spaced below the grid, certain of said side walls being provided above the applied drip pan with vent openings, and means for controlling flow through the vents.

11. A refrigerating apparatus as set forth in claim 1, wherein the grid is in sections, and each of said sections is in communication with the source of water supply, the inner extremity of each section being downwardly disposed, and a spray nozzle carried by said downwardly disposed portion.

12. A refrigerating apparatus as set forth in claim 1, wherein a lamination of heat conductive material is disposed over the inner face of the top wall, and heat absorption coils within the top wall and in contact with the lamination, said coils being substantially entirely within the field defined by the open top of the ice chamber.

ARTHUR J. PEDIGO.

REFERENCES CITED

The following references are of record in the file of this patent:

UNITED STATES PATENTS

| Number | Name | Date |
|---|---|---|
| 84,196 | Kellogg | Nov. 17, 1868 |
| 2,238,074 | Pedigo | Apr. 15, 1941 |
| 2,238,284 | Pedigo | Apr. 15, 1941 |
| 2,346,184 | Pedigo | Apr. 11, 1944 |
| 2,410,232 | Pedigo | Oct. 29, 1946 |

FOREIGN PATENTS

| Number | Country | Date |
|---|---|---|
| 782,509 | France | Mar. 2, 1934 |